US012198918B2

(12) United States Patent
Kang et al.

(10) Patent No.: US 12,198,918 B2
(45) Date of Patent: Jan. 14, 2025

(54) MASS SPECTROMETER

(71) Applicant: YOUNG IN ACE Co., Ltd., Gyeonggi-do (KR)

(72) Inventors: Sung Won Kang, Daejeon (KR); Hun Lee, Seoul (KR); Yoon Jin Jeong, Seoul (KR)

(73) Assignee: YOUNG IN ACE Co., Ltd., Gyeonggi-do (KR)

( * ) Notice: Subject to any disclaimer, the term of this patent is extended or adjusted under 35 U.S.C. 154(b) by 299 days.

(21) Appl. No.: 17/783,008

(22) PCT Filed: Feb. 4, 2021

(86) PCT No.: PCT/KR2021/001491
§ 371 (c)(1),
(2) Date: Jun. 7, 2022

(87) PCT Pub. No.: WO2021/172784
PCT Pub. Date: Sep. 2, 2021

(65) Prior Publication Data

US 2023/0016267 A1 Jan. 19, 2023

(30) Foreign Application Priority Data

Feb. 25, 2020 (KR) ........................ 10-2020-0022725

(51) Int. Cl.
*H01J 49/04* (2006.01)
*H01J 49/00* (2006.01)
(Continued)

(52) U.S. Cl.
CPC ...... *H01J 49/0422* (2013.01); *H01J 49/0027* (2013.01); *H01J 49/105* (2013.01); *H01J 49/4215* (2013.01)

(58) Field of Classification Search
CPC .. H01J 49/0422; H01J 49/0024; H01J 49/105; H01J 49/4215
See application file for complete search history.

(56) References Cited

U.S. PATENT DOCUMENTS 5,537,206 A 7/1996 Akiyoshi et al.
5,672,868 A * 9/1997 Mordehai ........... H01J 49/0445 250/281

(Continued)

FOREIGN PATENT DOCUMENTS

CN 110462784 A 11/2019
JP 2007309879 A 11/2007

(Continued)

OTHER PUBLICATIONS

Gilchrist, F.J., et al., "The in vitro Identification and Quantifiction of Volatile Biomarkers Released by Cystic Fibrosis Pathogens," Anal. Methods, 7:818-824 (2015).

(Continued)

*Primary Examiner* — Sean M Luck
(74) *Attorney, Agent, or Firm* — HoustonHogle LLP

(57) ABSTRACT

Provided is a mass spectrometer including: an ion generation unit configured to provide an ion generation path; an ion selection unit configured to provide an ion selection path connected to the ion generation path; a reaction unit configured to provide a reaction path connected to the ion selection path; a second ion selection unit configured to provide a second ion selection path connected to the reaction path; and an ion detection unit coupled to the second ion selection unit. The ion selection path and the reaction path extend in a first direction, and the reaction unit includes: a reaction pipe extending in the first direction to define the reaction path; and a sample inflow pipe coupled to the reaction pipe. The sample inflow pipe provides a sample inflow path connected to the reaction path, and the sample (Continued)

inflow path includes an inclined path. The inclined path extends to form an acute angle (α) with respect to the first direction.

16 Claims, 6 Drawing Sheets

(51) Int. Cl.

| | |
|---|---|
| ***H01J 49/10*** | (2006.01) |
| ***H01J 49/42*** | (2006.01) |

(56) References Cited

U.S. PATENT DOCUMENTS

| | | | | |
|---|---|---|---|---|
| 6,222,185 | B1 * | 4/2001 | Speakman .......... | H01J 49/0481 250/288 |
| 7,060,987 | B2 | 6/2006 | Lee et al. | |
| 7,453,061 | B2 | 11/2008 | Park et al. | |
| 8,278,621 | B2 | 10/2012 | Ahn | |
| 9,881,780 | B2 * | 1/2018 | Verenchikov ......... | H01J 49/062 |
| 10,515,790 | B2 | 12/2019 | Cheng et al. | |
| 11,049,706 | B2 | 6/2021 | Yoshinari et al. | |
| 11,150,228 | B2 | 10/2021 | Clark et al. | |
| 2003/0189169 | A1 * | 10/2003 | Wells ...................... | H01J 49/04 250/288 |
| 2010/0059675 | A1 | 3/2010 | Mukaibatake | |
| 2011/0147575 | A1 * | 6/2011 | Mordehai ............. | H01J 49/066 250/288 |
| 2013/0008217 | A1 | 1/2013 | Hosoe et al. | |
| 2013/0082172 | A1 | 4/2013 | Syage et al. | |
| 2016/0013037 | A1 | 1/2016 | Jorabchi et al. | |
| 2017/0032949 | A1 | 2/2017 | Covey et al. | |
| 2017/0162375 | A1 * | 6/2017 | Hasegawa ............... | H01J 49/34 |
| 2021/0233759 | A1 | 7/2021 | Kim et al. | |

FOREIGN PATENT DOCUMENTS

| | | | |
|---|---|---|---|
| JP | 2009076222 | A | 4/2009 |
| JP | 2018-520481 | A | 7/2018 |
| JP | 2019165018 | A | 9/2019 |
| KR | 10-1996-0042052 | A | 12/1996 |
| KR | 10-0178558 | B1 | 5/1999 |
| KR | 10-20160146755 | A | 9/2004 |
| KR | 10-2007-0064706 | A | 6/2007 |
| KR | 10-2012-0023434 | A | 3/2012 |
| KR | 10-2036259 | B1 | 10/2019 |
| KR | 10-2132977 | B1 | 7/2020 |
| WO | WO 2004079765 | A2 | 9/2004 |
| WO | WO 2019076490 | A1 | 4/2019 |

OTHER PUBLICATIONS

Hansel, A., et al., "Proton Transfer Reaction Mass Spectrometry: On-Line Trace Gas Analysis at the PPB Level," Int'l J. of Mass Spectrometry and Ion Processes, 149/150: 609-619 (1995).

International Preliminary Report on Patentability mailed on Sep. 9, 2022, from International Application No. PCT/KR2021/001491, filed on Feb. 4, 2021, 10 pages.

Francis, G.J., SIFT-MS: Development of Instrumentation and Applications, University of Canterbury, 1-270 (2007).

International Search Report of the International Searching Authority, mailed on May 28, 2021, from International Application No. PCT/KR2021/001491, filed on Feb. 4, 2021. 7 pages.

Written Opinion mailed on May 28, 2021, from International Application No. PCT/KR2021/001491, filed on Feb. 4, 2021. 3 pages.

* cited by examiner

MASS SPECTROMETER

RELATED APPLICATIONS

This application is a § 371 National Phase Application of International Application No. PCT/KR2021/001491, filed on Feb. 4, 2021, now International Publication No. WO 2021/172784 A1, published on Sep. 2, 2021, which International Application claims priority to Korean Application 10-2020-0022725, filed on Feb. 25, 2020, both of which are incorporated herein by reference in their entirety.

TECHNICAL FIELD

The present invention relates to a mass spectrometer, and more particularly, to a mass spectrometer including a sample inflow pipe that provides an inclined path.

BACKGROUND ART

As air and water pollution, including fine dust and the like, is accelerated, a method capable of measuring and analyzing the pollution is required. Mass spectrometers may be used for the measurement and analysis.

The mass spectrometers are instruments that identify or analyze chemical agents or the like by mass spectrometry. Such a mass spectrometer may measure the mass of a material as a mass-to-charge ratio and analyze components of a specimen. The specimen may be ionized using various methods inside the mass spectrometer. The ionized specimen may be accelerated while passing through an electric and/or magnetic field. That is, some or all of the ionized specimens may have pathways that are bent by the electric field and/or magnetic field. A detector may detect the ionized specimen.

DISCLOSURE OF THE INVENTION

Technical Problem

An object of the present invention is to provide a mass spectrometer capable of adjusting the flow speed of a sample gas.

An object of the present invention is to provide a mass spectrometer capable of accelerating ionization reaction of a sample gas.

An object of the present invention is to provide a mass spectrometer capable of preventing neutralization of an ionized sample gas.

An object of the present invention is to provide a mass spectrometer capable of enhancing accuracy of measurement.

The objects of the present invention are not limited to the aforementioned objects, but other objects not described herein will be clearly understood by those skilled in the art from the following description.

Technical Solution

A mass spectrometer according to an embodiment of the present invention to achieve the object includes: an ion generation unit configured to provide an ion generation path; an ion selection unit configured to provide an ion selection path connected to the ion generation path; a reaction unit configured to provide a reaction path connected to the ion selection path; a second ion selection unit configured to provide a second ion selection path connected to the reaction path; and an ion detection unit coupled to the second ion selection unit, wherein the ion selection path and the reaction path extend in a first direction, and the reaction unit includes: a reaction pipe extending in the first direction to define the reaction path; and a sample inflow pipe coupled to the reaction pipe, wherein the sample inflow pipe provides a sample inflow path connected to the reaction path, and the sample inflow path includes an inclined path, wherein the inclined path extends to form an acute angle ($\alpha$) with respect to the first direction.

In the mass spectrometer according to an embodiment of the present invention to achieve the object, the inclined path may include a diffusion path of which a diameter increases gradually in an extension direction of the inclined path.

In the mass spectrometer according to an embodiment of the present invention to achieve the object, the inclined path may further include a connection path which has a constant diameter and is connected to a front end of the diffusion path, wherein the maximum value of the diameter of the diffusion path is four to eight times the diameter of the connection path.

In the mass spectrometer according to an embodiment of the present invention to achieve the object, the sample inflow path may further include a vertical path that extends in a second direction perpendicular to the first direction, wherein the inclined path is connected to the bottom of the vertical path, and thus the vertical path is connected to the reaction path via the inclined path.

In the mass spectrometer according to an embodiment of the present invention to achieve the object, the angle formed between the extension direction of the inclined path and the first direction may be 10 degrees to 50 degrees.

In the mass spectrometer according to an embodiment of the present invention to achieve the object, the ion selection unit may include a first quadrupole filter positioned in the ion selection path.

In the mass spectrometer according to an embodiment of the present invention to achieve the object, the second ion selection unit may include a second quadrupole filter positioned in the second ion selection path.

In the mass spectrometer according to an embodiment of the present invention to achieve the object, the ion detection unit may include an ion detector, wherein the ion detector is exposed to the second ion selection path.

The mass spectrometer according to an embodiment of the present invention to achieve the object may further include a carrier gas inflow unit positioned between the ion selection unit and the reaction unit, wherein the carrier gas inflow unit includes: a first connection pipe configured to define a first connection path that connects the ion selection path to the reaction path; an orifice positioned in the first connection path and defining a mixing path; and a carrier gas inflow pipe configured to define a carrier gas inflow path, wherein the mixing path extends in the first direction, and the carrier gas inflow path extends in a direction intersecting with the first direction and is connected to the mixing path.

The mass spectrometer according to an embodiment of the present invention to achieve the object may further include a first pump connected to the ion selection unit; a second pump connected to the reaction unit; and a third pump connected to the second ion selection unit.

The mass spectrometer according to an embodiment of the present invention to achieve the object may further include a sample supply unit connected to the sample inflow pipe.

In the mass spectrometer according to an embodiment of the present invention to achieve the object, the reaction path may include: an enlarged reaction path of which a diameter increases gradually in the first direction; and a connection reaction path connected to the enlarged reaction path in the first direction with respect to the enlarged reaction path.

In the mass spectrometer according to an embodiment of the present invention to achieve the object, the sample inflow path may be connected to the enlarged reaction path.

In the mass spectrometer according to an embodiment of the present invention to achieve the object, the reaction path may further include a reduced reaction path connected to the connection reaction path in the first direction with respect to the connection reaction path.

In the mass spectrometer according to an embodiment of the present invention to achieve the object, the sample inflow pipe may include stainless steel.

Specific details of other embodiments of the present invention are not limited to those described above, and other features not described herein will be clearly understood by those skilled in the art from the following description.

Advantageous Effects

According to a mass spectrometer of the present invention, the flow speed of a sample gas may be adjusted.

According to a mass spectrometer of the present invention, ionization reaction of a sample gas may be accelerated.

According to a mass spectrometer of the present invention, neutralization of an ionized sample gas may be prevented.

According to a mass spectrometer of the present invention, accuracy of measurement may be enhanced.

The effects of the present invention are not limited to the aforementioned effects, but other effects not described herein will be clearly understood by those skilled in the art from the following description.

MODE FOR CARRYING OUT THE INVENTION

Figure 1:
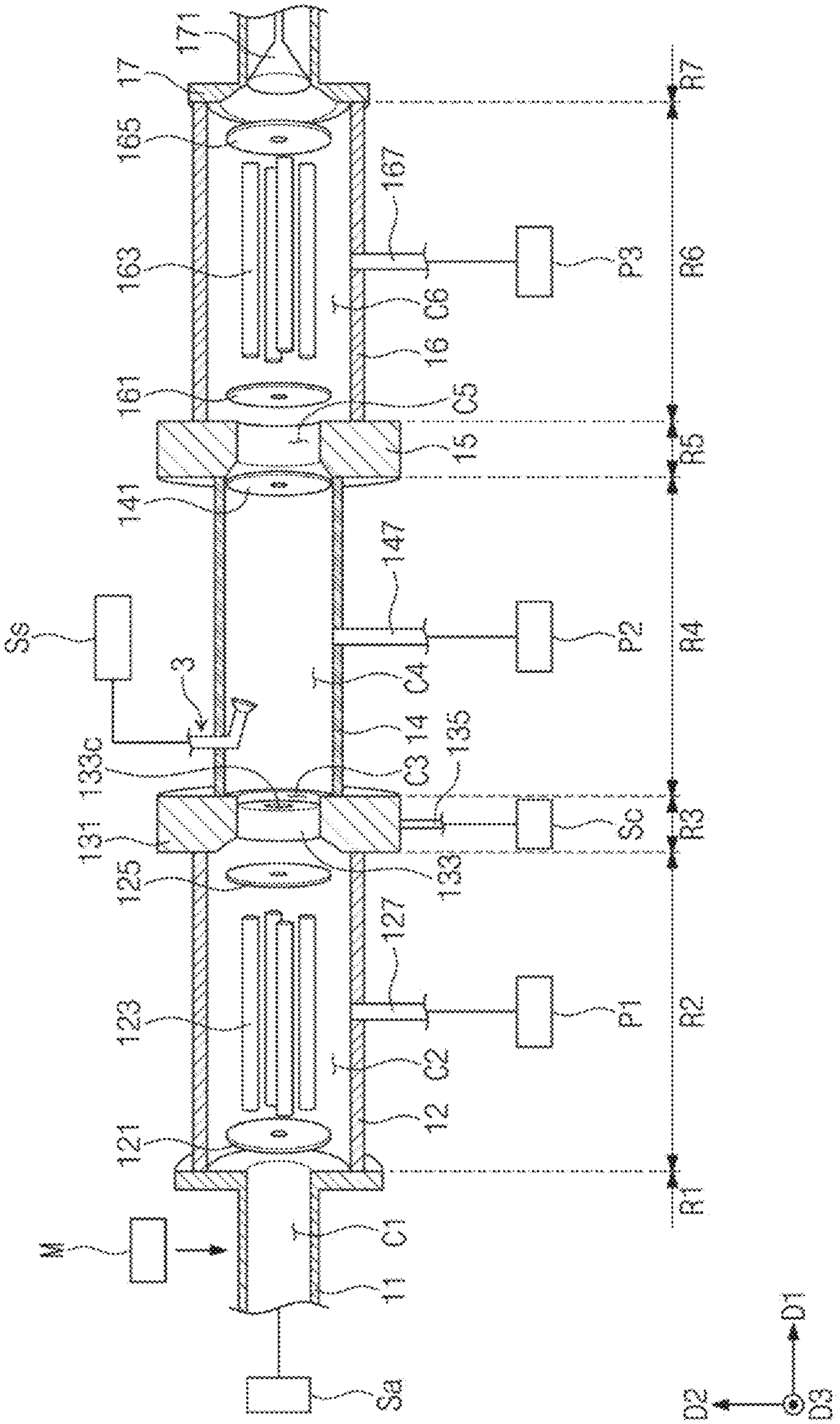
FIG. 1 is a partially cut perspective view of a mass spectrometer according to exemplary embodiments of the present invention.

Preferred embodiments of the inventive concept will be described with reference to the accompanying drawings so as to sufficiently understand configurations and effects of the inventive concept. However, the inventive concept may not be limited to the embodiments set forth herein, but embodied in different forms and diversely modified. Rather, these embodiments are provided so that the disclosure of the inventive concept will be thorough and complete, and will fully convey the scope of the invention to a person skilled in the art to which the present invention pertains.

Like reference numerals refer to like elements throughout. The embodiments in this specification will be described with reference to a block diagram, a perspective view, and/or a cross-sectional view as ideal exemplary views of the inventive concept. In the drawing, the thicknesses of regions are exaggerated for effective description of the technical contents. Therefore, regions exemplified in the drawings have general properties, and shapes of the regions exemplified in the drawings are used to illustrate a specific shape of a device region, but not intended to limit the scope of the invention. Although various terms are used to describe various components in various embodiments of this specification, the components should not be limited to these terms. These terms are only used to distinguish one component from another component. The embodiments described and exemplified herein include complementary embodiments thereof.

The terms used in this specification are used only for explaining embodiments while not limiting the present invention. In this specification, the singular forms include the plural forms as well, unless the context clearly indicates otherwise. The meaning of 'comprises' and/or 'comprising' used in the specification does not exclude the presence or addition of one or more other components besides the mentioned components.

Hereinafter, the present invention will be described in detail by describing preferred embodiments of the inventive concept with reference to the accompanying drawings.

FIG. 1 is a partially cut perspective view of a mass spectrometer according to exemplary embodiments of the present invention.

Hereinafter, D1 of FIG. 1 may be referred to as a first direction, D2 may be referred to as a second direction, and D3 substantially perpendicular to the first direction D1 and the second direction D2 may be referred to as a third direction.

Referring to FIG. 1, the mass spectrometer may include an ion generation unit R1, an ion selection unit R2, a carrier gas inflow unit R3, a reaction unit R4, a connection unit R5, a second ion selection unit R6, a detection unit R7. In embodiments, the mass spectrometer may further include an ion source supply unit Sa, a microwave supply unit M, a first pump P1, a carrier gas supply unit Sc, a sample supply unit Ss, a second pump P2, a third pump P3, and the like.

The ion generation unit R1 may include an ion generation pipe 11. The ion generation pipe 11 may extend in the first direction D1. The ion generation pipe 11 may provide an ion generation path C1. That is, the ion generation pipe 11 may define the ion generation path C1. The ion generation path C1 may extend in the first direction D1. The ion generation unit R1 may receive an ion source from the ion source supply unit Sa. More specifically, the ion source may be supplied from the ion source supply unit Sa to the ion generation path C1. The ion source may represent particles that can be changed into ions. More specifically, the ion source may represent particles that can be changed into reagent ions through an ionization reaction. The reagent ions may represent ions that can react with the sample gas. The ion source may include neutral molecules and the like. For example, the ion source may include nitrogen ($N_2$), oxygen ($O_2$), and/or water ($H_2O$). However, the embodiment is not limited thereto. This will be described later in more detail. The ion source may move along the ion generation path C1 in the first direction D1. The ion source may be ionized in the ion generation path C1. More specifically, due to application of microwaves from the microwave supply unit M, the ion source may be ionized. That is, the ion source may be changed into the reagent ions. For example, when the ion source includes nitrogen ($N_2$), oxygen ($O_2$), and/or water ($H_2O$), the reagent ions may include $H_3O^+$, $NO^+$, and/or $O_2^+$. The reagent ions move along the first direction D1 and may move to the ion selection unit R2. In embodiments, the ion generation path C1 may be maintained at very low pressure. For example, the ion generation path C1 may be maintained at pressure of about 0.3 torr. The ionization operation of the ion source may be performed under the low pressure substantially close to vacuum.

The ion selection unit R2 may filter the reagent ions that flow into from the ion generation unit R1. The ion selection unit R2 may include an ion selection pipe 12, a first focusing member 121, a first quadrupole filter 123, a second focusing member 125, and a first pump connection pipe 127. The ion selection pipe 12 may be connected to the ion generation pipe 11. The ion selection pipe 12 may extend in the first direction D1. The ion selection pipe 12 may provide an ion selection path C2. That is, the ion selection pipe 12 may define the ion selection path C2. The ion selection path C2 may be connected to the ion generation path C1. The ion selection path C2 may extend in the first direction D1. The first focusing member 121 may be positioned in the ion selection path C2. The first focusing member 121 may have a plate shape with a hole formed at the center. The first focusing member 121 may guide flow of the reagent ions, which have flowed into from the ion generation path C1, to the center. The first quadrupole filter 123 may include four rods which surround a pathway of the reagent ions that have passed through the first focusing member 121. Each of the four rods may extend in the first direction D1. Each of the four rods may include metal. Each of the four rods may receive voltage from an external power supply (not shown) or the like. The first quadrupole filter 123 may form an electric field. The movement pathway of some or all of the reagent ions may be bent by the electric field formed by the first quadrupole filter 123. When the movement pathways of the reactants of ions are curved, only some ions may be selectively allowed to pass through the second focusing member 125. Accordingly, it is possible to prevent unnecessary ions from moving to the carrier gas inflow unit R3. That is, among various ions, only necessary reagent ions may be filtered by the first quadrupole filter 123 in the ion selection unit R2. For example, the necessary reagent ions may represent ions required for reaction to ionize the sample gas. The second focusing member 125 may have a plate shape with a hole formed at the center. The second focusing member 125 may guide flow of the filtered reagent ions to the center. The first pump connection pipe 127 may be connected to the first pump P1. By the first pump P1, the ion selection path C2 may be maintained at very low pressure. For example, the ion selection path C2 may be maintained at pressure of about $10^{-5}$ torr. The filtering operation of ions may be performed under the low pressure substantially close to vacuum.

The carrier gas inflow unit R3 may be positioned between the ion selection unit R2 and the reaction unit R4. The carrier gas inflow unit R3 may include a first connection pipe 131, an orifice 133, and a carrier gas inflow pipe 135. The first connection pipe 131 may be coupled to the ion selection pipe 12. The first connection pipe 131 may extend in the first direction D1. The first connection pipe 131 may provide a first connection path C3. That is, the first connection path C3 may be defined by the first connection pipe 131. The first connection path C3 may extend in the first direction D1. The first connection path C3 may be connected to the ion selection path C2. The orifice 133 may be positioned in the first connection path C3. The orifice 133 may include a portion of a cylindrical shape. A mixing path 133*c* may be provided in the middle of the orifice 133. The mixing path 133*c* may be connected to the ion selection path C2. The carrier gas inflow pipe 135 may extend in a direction intersecting with the first direction D1. The carrier gas inflow pipe 135 may be coupled to the first connection pipe 131. The inner space of the carrier gas inflow pipe 135 may be connected to the mixing path 133*c*. The carrier gas inflow pipe 135 may be connected to the carrier gas supply unit Sc. A carrier gas may flow from the carrier gas supply unit Sc to the mixing path 133*c* via the carrier gas inflow pipe 135. The carrier gas may be mixed with the reagent ions in the mixing path 133*c*. The carrier gas may guide flow of the reagent ions and the like in the reaction unit R4. For example, the carrier gas may form laminar flow in the reaction unit R4 to guide the flow direction of the reagent ions. The carrier gas may include an inert gas and the like. For example, the carrier gas may include nitrogen ($N_2$), argon (Ar), and/or helium (He). This will be described later in detail.

The reaction unit R4 may include a reaction pipe 14, a sample inflow pipe 3, a second pump connection pipe 147, and a third focusing member 141. The reaction pipe 14 may be connected to the first connection pipe 131. The reaction pipe 14 may extend in the first direction D1. The reaction pipe 14 may provide a reaction path C4. That is, the reaction path C4 may be defined by the reaction pipe 14. The reaction path C4 may extend in the first direction D1. The reaction path C4 may be connected to the first connection path C3. The carrier gas and the reagent ions may flow into the reaction path C4. The sample inflow pipe 3 may be coupled to the reaction pipe 14. The sample inflow pipe 3 may be connected to the sample supply unit Ss. The sample inflow pipe 3 may receive the sample gas from the sample supply unit Ss and send the same to the reaction path C4. The sample inflow pipe 3 will be described in detail with reference to FIGS. 2 and 3. The sample gas may include an object for which mass spectrometry is required. For example, the sample gas may include volatile organic compounds (VOCs) and the like. The sample gas flowing in from the sample inflow pipe 3 may react with the reagent ions. More specifically, the sample gas may react with the reagent ions and then be ionized. The ionized sample gas may be referred to as sample ions. That is, the sample gas reacts with the reagent ions and then may be changed into the sample ions. The ionization reaction of the sample gas may be expressed as below.

$$R^+ + A \rightarrow P^+ + N$$

$R^+$ may represent the reagent ions. A may represent the sample gas. $P^+$ may represent the sample ions. N may represent reagent ions which are neutralized after the reaction with the sample gas. For example, N may represent re-neutralized ion source. The third focusing member 141 may have a plate shape with a hole formed at the center. The third focusing member 141 may guide flow of the sample ions and the reagent ions to the center. The second pump connection pipe 147 may be connected to the reaction path C4. The second pump connection pipe 147 may be connected to the second pump P2. The second pump P2 may be connected to the reaction path C4 via the second pump connection pipe 147. By the second pump P2, the reaction path C4 may be maintained at very low pressure. For example, the reaction path C4 may be maintained at pressure of about 0.5 torr. The ionization operation of the sample gas may be performed under the low pressure.

The connection unit R5 may include a second connection pipe 15. The second connection pipe 15 may be coupled to the reaction pipe 14. The connection pipe 15 may provide a second connection path C5. That is, the second connection path C5 may be defined by the second connection pipe 15. The second connection path C5 may extend in the first direction D1. The second connection path C5 may be connected to the reaction path C4.

The second ion selection unit R6 may include a second ion selection pipe 16, a fourth focusing member 161, a second quadrupole filter 163, a fifth focusing member 165, and a third pump connection pipe 167. The second ion selection pipe 16 may be coupled to the second connection pipe 15. The second ion selection pipe 16 may extend in the first direction D1. The second ion selection pipe 16 may provide a second ion selection path C6. That is, the second ion selection path C6 may be defined by the second ion selection pipe 16. The second ion selection path C6 may extend in the first direction D1. The second ion selection path C6 may be connected to the second connection path C5. The carrier gas, the sample ions, and the like may flow into the second ion selection path C6 via the second connection path C5. The fourth focusing member 161 may be positioned in the second ion selection path C6. The fourth focusing member 161 may have a plate shape with a hole formed at the center. The fourth focusing member 161 may guide flow of the particles, which have flowed into from the second connection path C5, to the center. The second quadrupole filter 163 may include four rods which surround a pathway of the particles that have passed through the fourth focusing member 161. Each of the four rods may extend in the first direction D1. Each of the four rods may include metal. Each of the four rods may receive voltage from an external power supply (not shown) or the like. The second quadrupole filter 163 may form an electric field. The movement pathway of some or all of the particles such as the sample ions may be bent by the electric field formed by the second quadrupole filter 163. Particles in an ionic state may have different degrees of bending according to a ratio of mass and charge. Ions that do not require measurement may have movement pathways which are bent by the electric field formed by the second quadrupole filter 163. For example, remaining reagent ions, which have not reacted with the sample gas in the reaction unit R4, may not be moved straight by the second quadrupole filter 163. The ions, which do not move straight, may not pass through the fifth focusing member 165. The fifth focusing member 165 may have a plate shape with a hole formed at the center. The fifth focusing member 165 may guide flow of the particles. The third pump connection pipe 167 may be connected to the third pump P3. By the third pump P3, the second ion selection path C6 may be maintained at very low pressure. For example, the second ion selection path C6 may be maintained at pressure of about $10^{-5}$ torr. The filtering operation of the sample ions may be performed under the low pressure substantially close to vacuum.

The detection unit R7 may include a detection pipe 17 and a detector 171. The detection pipe 17 may be connected to the second ion selection pipe 16. The detector 171 may be positioned inside the detection pipe 17. The detector 171 may be exposed to the second ion selection path C6. As illustrated in FIG. 1, the normal line to the detector 171 may be substantially parallel to the first direction D1. However, the embodiment is not limited thereto, and the normal line to the detector 171 may form a certain degree with the first direction D1. For example, the normal line to the detector 171 may be substantially perpendicular to the first direction D1. The sample ions filtered in the second ion selection path C6 may be detected by the detector 171. For example, when the normal line to the detector 171 is substantially parallel to the first direction D1, the detector 171 may measure the amount of the sample ions that are not bent by the electric field formed by the second quadrupole filter 163 and move straight. That is, when only some ions are set to move straight by controlling the second quadrupole filter 163, the detector 171 may measure the number of ions that move straight. By using information about the electric field applied by the second quadrupole filter 163, a mass-to-charge ratio (m/z) of the ions, which move straight and are detected in the detector 171, may be calculated. The ions supposed to move straight may be changed by the controlling the second quadrupole filter 163. Subsequently, the same operations may be repeated. Accordingly, mass-to-charge ratios (m/z) for various ions may be obtained. When the measured data is compared with data of previously acquired mass-to-charge ratio (m/z), the mass of particles and the ratio thereof in the sample gas may be obtained. When the normal line to the detector 171 is not parallel to the first direction D1, the detector 171 may measure the amount of the sample ions that are bent by the electric field formed by the second quadrupole filter 163. In this case, the measurement method may be substantially identical or similar to that when the normal line to the detector 171 is parallel to the first direction D1.

The ion source supply unit Sa may supply the ion source to the ion generation unit R1. The ion source may supply oxygen ($O_2$), nitrogen ($N_2$), and/or water ($H_2O$). In embodiments, the ion source supplied from the ion source supply unit Sa to the ion generation unit R1 may be similar to the composition of atmosphere.

The microwave supply unit M may apply microwaves to the ion generation unit R1. The ion source, which have flowed into the ion generation unit R1, may be ionized by the microwaves. That is, the ion source may be ionized and changed into the reagent ions.

The first pump P1 may be connected to the ion selection path C2 by the first pump connection pipe 127. The first pump P1 may maintain the ion selection path C2 in a state substantially close to a vacuum state. For example, the first pump P1 may maintain the ion selection path C2 at pressure of about $10^{-5}$ torr.

The carrier gas supply unit Sc may be connected to the mixing path 133*c* via the carrier gas inflow pipe 135. The carrier gas supply unit Sc may supply the carrier gas. The carrier gas may include an inert gas and the like. For example, the carrier gas may include nitrogen ($N_2$), helium (He), and/or argon (Ar). The carrier gas may be mixed with the reagent ions in the mixing path 133*c*. The carrier gas may flow into the reaction path C4. The carrier gas may form laminar flow in the reaction path C4 in the first direction D1.

The sample supply unit Ss may supply the sample gas to the sample inflow pipe 3. The sample gas may include an object for which mass spectrometry is required. For example, the sample gas may include volatile organic compounds (VOCs) and the like. The sample gas may flow into the reaction path C4 via the sample inflow pipe 3. This will be described later in detail.

The second pump P2 may be connected to the reaction path C4 via the second pump connection pipe 147. The second pump P2 may maintain the reaction path C4 in a state substantially close to a vacuum state. For example, the second pump P2 may maintain the reaction path C4 at pressure of about 0.5 torr.

The third pump P3 may be connected to the second ion selection path C6 via the third pump connection pipe 167. The third pump P3 may maintain the second ion selection path C6 in a state substantially close to a vacuum state. For example, the third pump P3 may maintain the second ion selection path C6 at pressure of about $10^{-5}$ torr.

Figure 2:
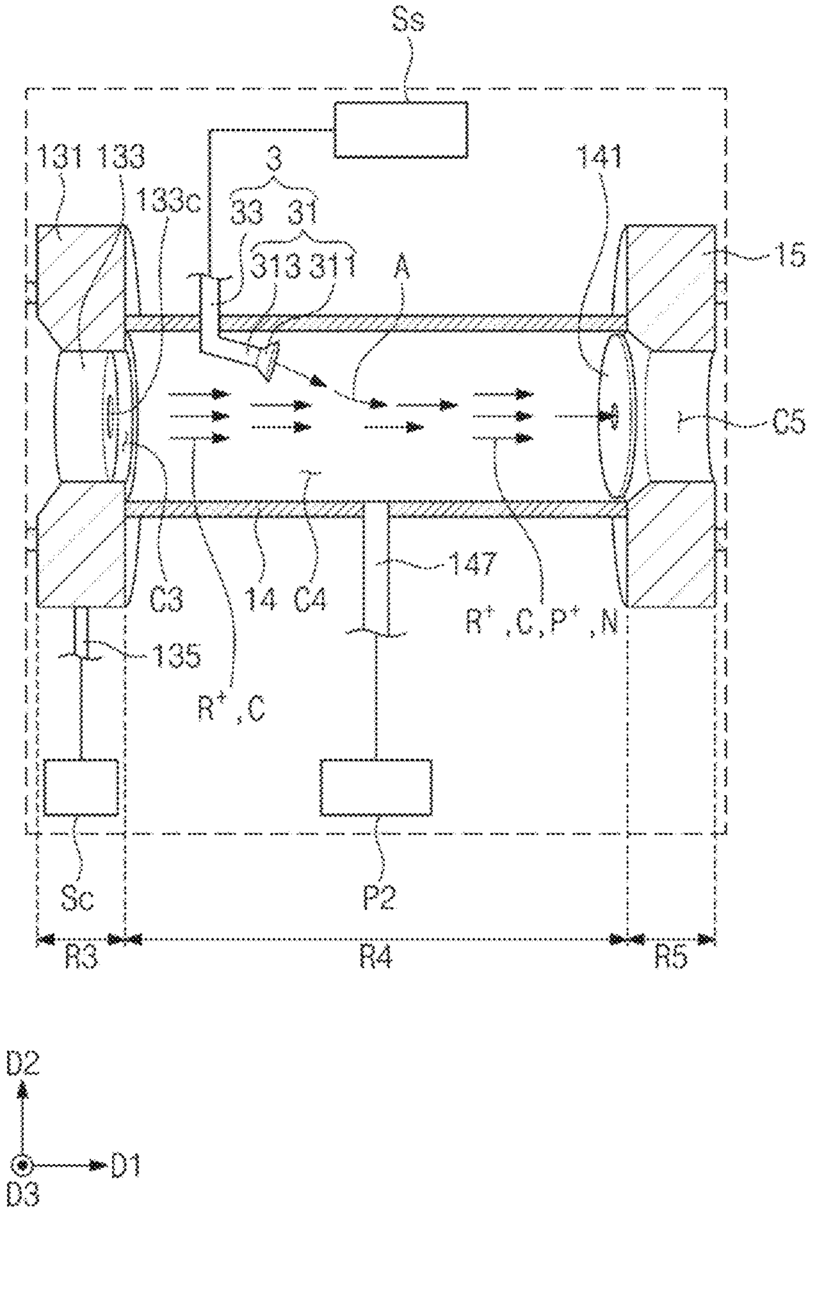
FIG. 2 is a partially enlarged view illustrating a portion of FIG. 1.

FIG. 2 is a partially enlarged view illustrating a portion of FIG. 1.

Referring to FIG. 2, the sample inflow pipe 3 may include a vertical pipe 33 and an inclined pipe 31. The vertical pipe 33 may be substantially perpendicular to the first direction D1. The inclined pipe 31 may form an acute angle with the first direction D1. The inclined pipe 31 may be coupled to the lower end of the vertical pipe 33. The inclined pipe 31 may include a connection inclined pipe 313 and a diffusion pipe 311. The diameter of the connection inclined pipe 313 may be constant. More specifically, the diameter of the connection inclined pipe 313 may be constant in the extension direction of the inclined pipe 31. The diameter of the diffusion pipe 311 may not be constant. More specifically, the diameter of the diffusion pipe 311 may increase gradually in the extension direction of the inclined pipe 31.

A sample gas A may flow into the reaction path C4 via the sample inflow pipe 3. The sample gas A escaping from the diffusion pipe 311 may react with the reagent ions $R^+$ in the reaction path C4. More specifically, the reagent ions $R^+$ flowing in the reaction path C4 via the mixing path 133*c* may react with the sample gas A flowing in the reaction path C4 via the diffusion pipe 311. The sample gas A may react with the reagent ions $R^+$ and change into sample ions $P^+$. Reagent ions $R^+$, a carrier gas C, sample ions $P^+$, and an ion source N, which have not reacted, may flow at the rear end of the reaction path C4.

Figure 3:
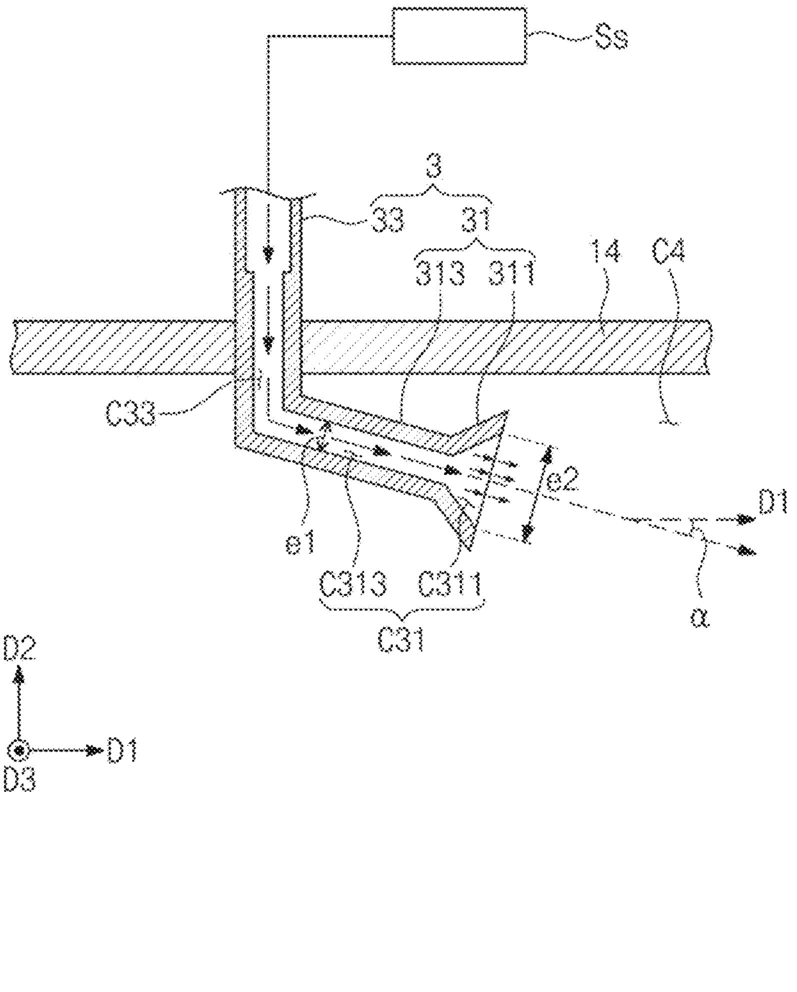
FIG. 3 is a cross-sectional view of a sample inflow pipe of a mass spectrometer according to exemplary embodiments of the present invention.

FIG. 3 is a cross-sectional view of the sample inflow pipe of the mass spectrometer according to exemplary embodiments of the present invention.

Referring to FIG. 3, the sample inflow pipe 3 may be coupled to the reaction pipe 14. The inclined pipe 31 may provide an inclined path C31. That is, the inclined path C31 may be defined by the inclined pipe 31. The inclined path C31 may form an acute angle α with the first direction D1. That is, the extension direction of the inclined path C31 and the first direction D1 may form the acute angle α. In embodiments, the acute angle α may be 10° to 50°. More specifically, the acute angle α may be 30°. When the acute angle α is 30°, distribution of the sample gas, the carrier gas, and the like may become appropriate. This will be described later in detail with reference to FIG. 6. The inclined path C31 may include a diffusion path C311 and a connection path C313. The diameter of the diffusion path C311 may increase gradually in the extension direction of the inclined path C31. The connection path C313 may be connected to the front end of the diffusion path C311. The diameter of the connection path C313 may be constant. In a portion that meets the connection path C313, the diameter of the diffusion path C311 may be substantially the same as the diameter of the connection path C313. The maximum diameter e2 of the diffusion path C311 may four times to eight times a diameter e1 of the connection path C313. The vertical pipe 33 may provide a vertical path C33. That is, the vertical path C33 may be defined by the vertical pipe 33. The vertical path C33 may extend in a direction substantially perpendicular to the first direction D1. The vertical path C33 may be connected to the connection path C313. The vertical path C33 may receive the sample gas from the sample supply unit Ss. That is, the sample gas may flow into the reaction path C4 from the sample supply unit Ss via the vertical path C33, the connection path C313, and the diffusion path C311.

In the mass spectrometer according to exemplary embodiments of the present invention, the sample gas may flow obliquely into the reaction pipe. The sample gas may be mixed with the flow of the carrier gas and/or the reagent ions which flow in the reaction pipe. Thus, the ionization reaction of the sample gas may be accelerated. Accordingly, accuracy of the mass spectrometry may be enhanced.

In the mass spectrometer according to exemplary embodiments of the present invention, the sample gas flows obliquely into the reaction pipe, and thus it is possible to prevent the sample gas and/or the sample ions from colliding with the opposite wall of the reaction pipe. Thus, it is possible to prevent the sample ions from being neutralized again due to the collision with the wall. Accordingly, accuracy of the mass spectrometry may be enhanced.

In the mass spectrometer according to exemplary embodiments of the present invention, the sample inflow pipe may include the diffusion path. That is, the flow speed of the sample gas that flows into the reaction pipe may become slow. That is, a reaction time between the sample gas and the reagent ions may be sufficiently secured. The ionization reaction of the sample gas may be accelerated. Accordingly, accuracy of the mass spectrometry may be enhanced.

Figure 4:
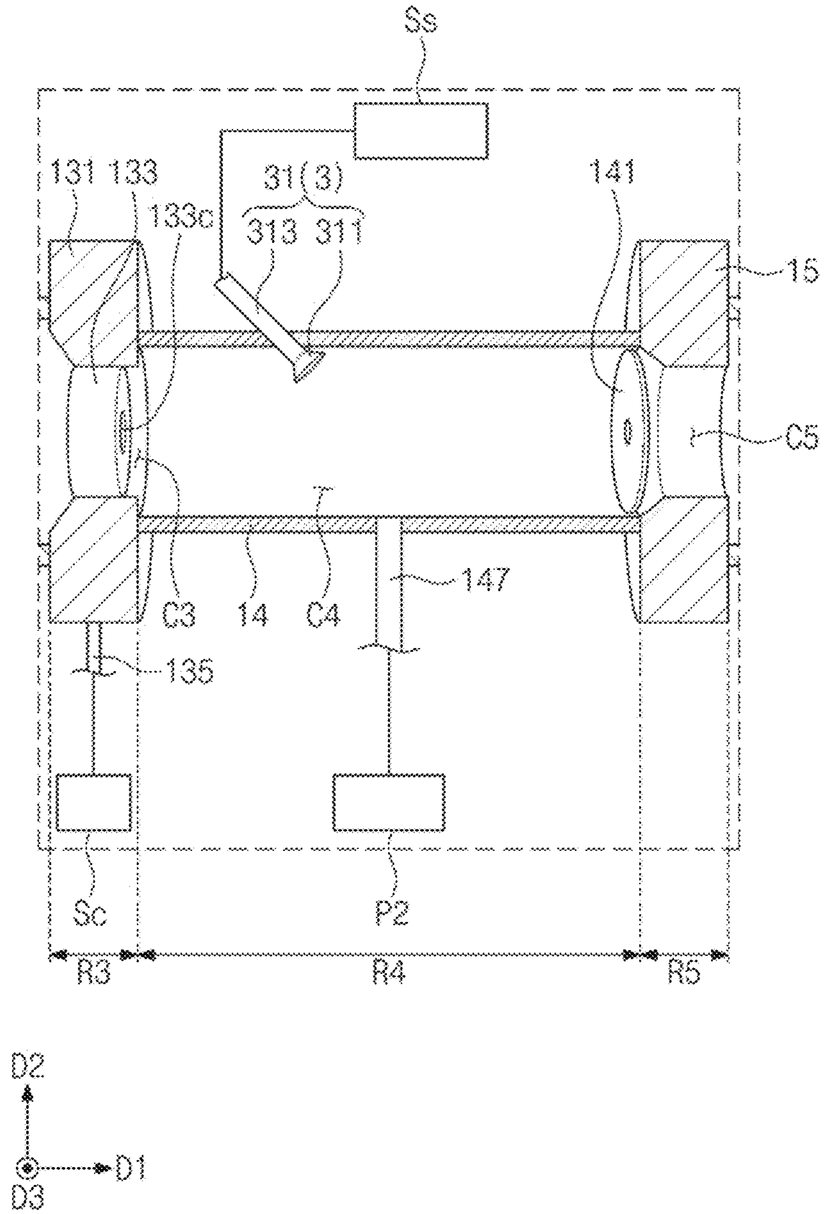
FIG. 4 is a partially enlarged view of a mass spectrometer according to exemplary embodiments of the present invention.

FIG. 4 is a partially enlarged view of a mass spectrometer according to exemplary embodiments of the present invention.

Hereinafter, descriptions substantially identical or similar to those described with reference to FIGS. 1 to 3 will be omitted for convenience.

Referring to FIG. 4, a sample inflow pipe 3 may include only an inclined pipe 31. That is, the vertical pipe 33 (see FIG. 2) described with reference to FIGS. 1 to 3 may not be present. The inclined pipe 31 may include a diffusion pipe 311 and a connection inclined pipe 313. The connection inclined pipe 313 may be coupled to a reaction pipe 14.

Figure 5:
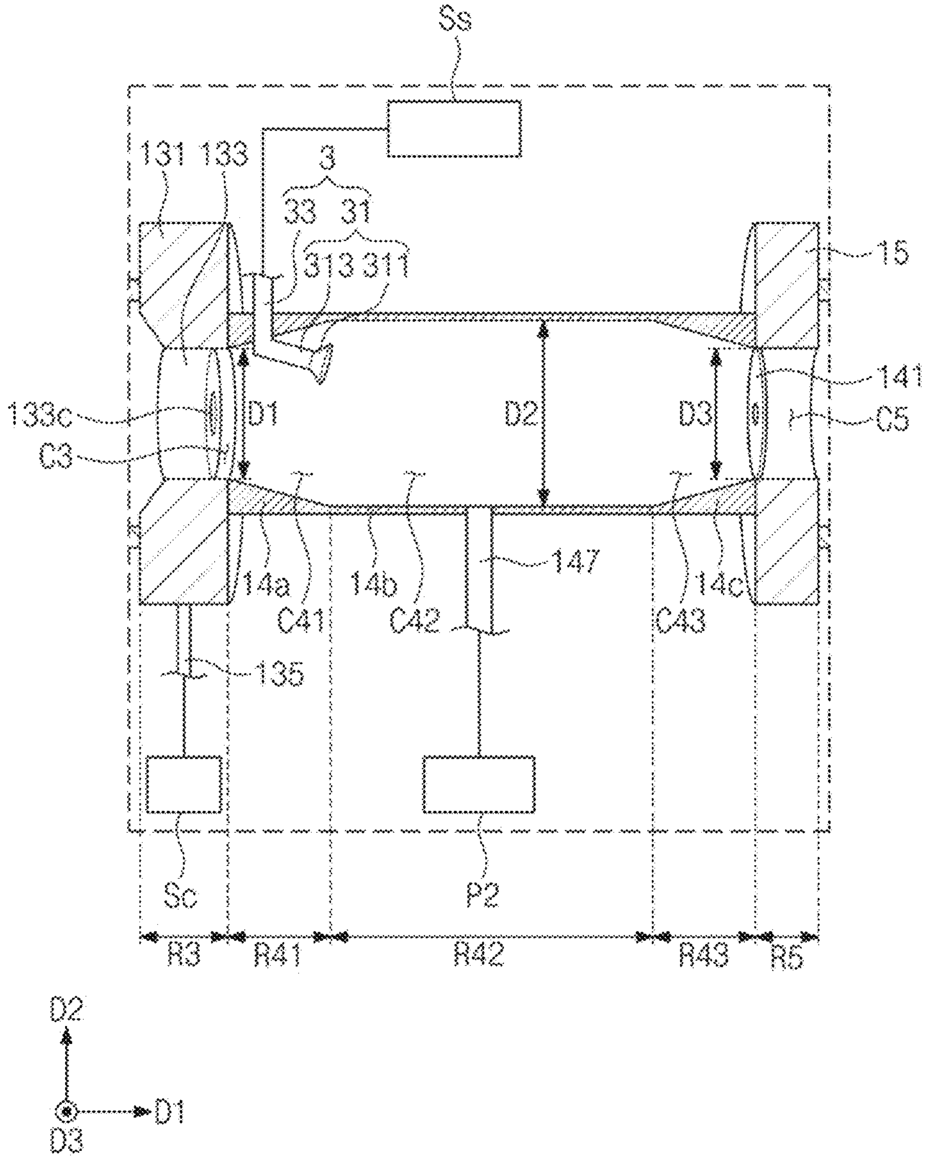
FIG. 5 is a partially enlarged view of a mass spectrometer according to exemplary embodiments of the present invention.

FIG. 5 is a partially enlarged view of a mass spectrometer according to exemplary embodiments of the present invention.

Hereinafter, descriptions substantially identical or similar to those described with reference to FIGS. 1 to 3 will be omitted for convenience.

Referring to FIG. 5, a reaction unit R4 may include an enlarged reaction unit R41, a connection reaction unit R42, and a reduced reaction unit R43.

The enlarged reaction unit R41 may include an enlarged reaction pipe 14*a*. The enlarged reaction pipe 14*a* may provide an enlarged reaction path C41. That is, the enlarged reaction path C41 may be defined by the enlarged reaction pipe 14*a*. The enlarged reaction path C41 may extend in a first direction D1. The diameter of the enlarged reaction path C41 may increase gradually in the first direction D1. More specifically, the minimum diameter of the enlarged reaction path C41 may be D1. The maximum diameter of the enlarged reaction path C41 may be D2. The diameter of the enlarged reaction path C41 may continuously increase from D1 to D2 in the first direction D1.

The connection reaction unit R42 may include a connection reaction pipe 14*b*. The connection reaction pipe 14*b* may provide a connection reaction path C42. The connection reaction path C42 may be defined by the connection reaction pipe 14*b*. The connection reaction path C42 may extend in the first direction D1. The connection reaction path C42 may be connected to the enlarged reaction path C41. The diameter of the connection reaction path C42 may be constant in the first direction D1. In embodiments, the diameter of the connection reaction path C42 may be D2. That is, the diameter of the connection reaction path C42 may be substantially the same as the maximum value of the diameter of the enlarged reaction path C41.

The reduced reaction unit R43 may include a reduced reaction pipe 14*c*. The reduced reaction pipe 14*c* may provide a reduced reaction path C43. That is, the reduced reaction path C43 may be defined by the reduced reaction pipe 14*c*. The reduced reaction path C43 may extend in the first direction D1. The reduced reaction path C43 may be connected to the connection reaction path C42. The diameter of the reduced reaction path C43 may decrease gradually in the first direction D1. The maximum value of the diameter of the reduced reaction path C43 may be substantially the same as the diameter of the connection reaction path C42. More specifically, the minimum diameter of the reduced reaction path C43 may be D2. The minimum diameter of the reduced reaction path C43 may be D3. The diameter of the reduced reaction path C43 may continuously decrease from D2 to D3 in the first direction D1.

A sample inflow pipe 3 may be coupled to the enlarged reaction pipe 14*a*. A sample gas supplied from a sample supply unit Ss may flow into the enlarged reaction path C41 via the sample inflow pipe 3.

In the mass spectrometer according to exemplary embodiments of the present invention, the diameter of the reaction pipe may increase gradually from a front portion of the reaction pipe in the first direction. Thus, speeds of a carrier gas and reagent ions, which flow into the reaction path and move in the first direction, may become slow. Accordingly, the flow of the carrier gas and the reagent ions may become stable. Also, the reaction between the reagent ions and the sample gas may be accelerated. Thus, the ionization of the sample gas may be actively performed. Thus, accuracy of the mass spectrometry may be enhanced.

Figure 6:
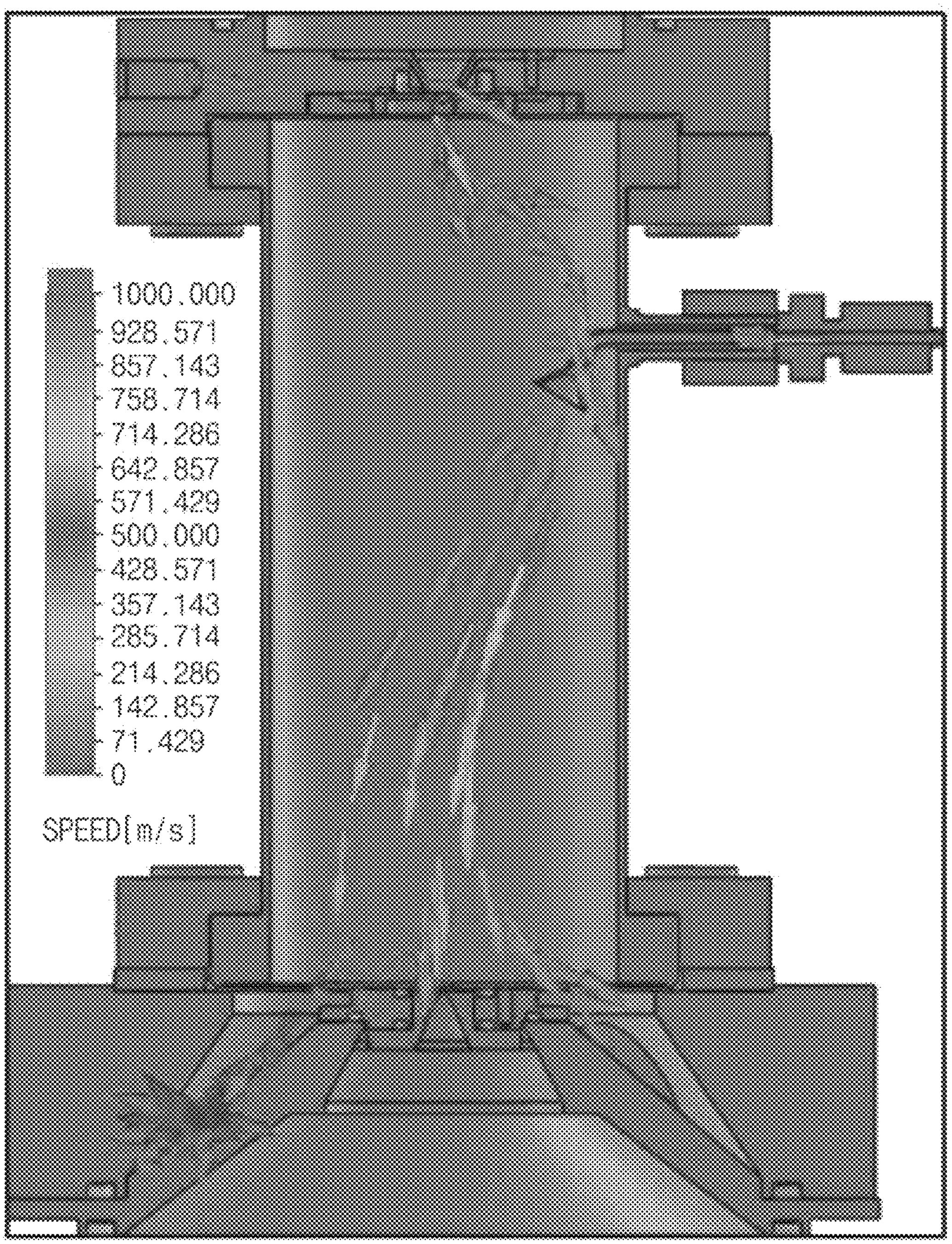
FIG. 6 is a view showing a simulation result of a mass spectrometer according to exemplary embodiments of the present invention.

FIG. 6 is a view showing a simulation result of a mass spectrometer according to exemplary embodiments of the present invention.

Referring to FIG. 6, flows of the carrier gas, the reagent ions, the sample gas, and the sample ions may be displayed in a computational fluid dynamics (CFD) simulation for the mass spectrometer according to the embodiments of FIG. 1. More specifically, the carrier gas and the reagent ions may flow into from the top to the bottom in FIG. 6. The sample gas may flow into through the sample inflow pipe on the side surface. The sample ions, which are produced by reaction of the sample gas with the reagent ions, and the carrier gas may be discharged downward in FIG. 6.

In simulation boundary conditions, the pressure at the front end portion of the reaction path may be $6.00*10^{-5}$ Torr. The pressure at the rear end portion of the reaction path may be 0.01 Torr. The inflow flow rate of the carrier gas flowing into the reaction path may be 2.5 TorrL/s. The discharge pressure by the second pump may be 0.01 Torr. The inclined path may form an inclination of about 30 degrees with respect to the first direction. Under these boundary conditions, the inflow flow rate of the sample gas flowing into the reaction path via the sample inflow pipe may be 2.27696 TorrL/s. The inflow speed of the sample gas may be 15.286 m/s. Referring to FIG. 6, the sample gas flowing into the reaction pipe via the inclined sample inflow pipe under these boundary conditions may not collide with the opposite wall of the reaction pipe but be joined in the flows of the carrier gas and the reagent ions. Thus, the reaction between the reagent ions and the sample gas may be accelerated. Also, since the sample gas flows into via the enlarged inclined pipe, the speed of the sample gas entering the reaction pipe may become slow. Thus, the reaction between the sample gas and the reagent ions may be accelerated. Under these boundary conditions, the sample ions, the carrier gas, and the like may escape through the center of the reaction path. Thus, the mass spectrometry operation may be smoothly continued.

Although the embodiments of the present invention are described with reference to the accompanying drawings, those with ordinary skill in the technical field to which the present invention pertains will understand that the present invention can be carried out in other specific forms without changing the technical idea or essential features. Therefore, the above-described embodiments are to be considered in all aspects as illustrative and not restrictive.

The invention claimed is:

1. A mass spectrometer comprising:
an ion generation unit configured to provide an ion generation path;
an ion selection unit configured to provide an ion selection path connected to the ion generation path;
a reaction unit configured to provide a reaction path connected to the ion selection path;
a second ion selection unit configured to provide a second ion selection path connected to the reaction path; and
an ion detection unit coupled to the second ion selection unit,
wherein the ion selection path and the reaction path extend in a first direction, and
the reaction unit comprises:
a reaction pipe extending in the first direction to define the reaction path; and
a sample inflow pipe coupled to the reaction pipe,
wherein the sample inflow pipe provides a sample inflow path connected to the reaction path, and
the sample inflow path comprises an inclined path,
wherein the inclined path extends to form an acute angle (α) with respect to the first direction.

2. The mass spectrometer of claim 1, wherein the inclined path comprises a diffusion path of which a diameter increases gradually in an extension direction of the inclined path.

3. The mass spectrometer of claim 2, wherein the inclined path further comprises a connection path which has a constant diameter and is connected to a front end of the diffusion path,
wherein the maximum value of the diameter of the diffusion path is four to eight times the diameter of the connection path.

4. The mass spectrometer of claim 1, wherein the sample inflow path further comprises a vertical path that extends in a second direction perpendicular to the first direction,
wherein the inclined path is connected to the bottom of the vertical path, and thus the vertical path is connected to the reaction path via the inclined path.

5. The mass spectrometer of claim 1, wherein the acute angle (α) formed between the extension direction of the inclined path and the first direction is 10 degrees to 50 degrees.

6. The mass spectrometer of claim 1, wherein the ion selection unit comprises a first quadrupole filter positioned in the ion selection path.

7. The mass spectrometer of claim 6, wherein the second ion selection unit comprises a second quadrupole filter positioned in the second ion selection path.

8. The mass spectrometer of claim 1, wherein the ion detection unit comprises an ion detector, wherein the ion detector is exposed to the second ion selection path.

9. The mass spectrometer of claim 1, further comprising a carrier gas inflow unit positioned between the ion selection unit and the reaction unit, wherein the carrier gas inflow unit comprises:

a first connection pipe configured to define a first connection path that connects the ion selection path to the reaction path;

an orifice positioned in the first connection path and defining a mixing path; and a carrier gas inflow pipe configured to define a carrier gas inflow path, wherein the mixing path extends in the first direction, and the carrier gas inflow path extends in a direction intersecting with the first direction and is connected to the mixing path.

10. The mass spectrometer of claim 1, further comprising a first pump connected to the ion selection unit;

a second pump connected to the reaction unit; and a third pump connected to the second ion selection unit.

11. The mass spectrometer of claim 1, further comprising a sample supply unit connected to the sample inflow pipe.

12. The mass spectrometer of claim 11, wherein the reaction path comprises:

an enlarged reaction path of which a diameter increases gradually in the first direction; and a connection reaction path connected to the enlarged reaction path in the first direction with respect to the enlarged reaction path.

13. The mass spectrometer of claim 12, wherein the sample inflow path is connected to the enlarged reaction path.

14. The mass spectrometer of claim 12, wherein the reaction path further comprises a reduced reaction path connected to the connection reaction path in the first direction with respect to the connection reaction path.

15. The mass spectrometer of claim 1, wherein the sample inflow pipe comprises stainless steel.

16. A method of operation of a mass spectrometer, the method comprising:

generating ions along an ion generation path;

selecting ions along a first ion selection path connected to the ion generation path;

providing a reaction along a reaction path connected to the first ion selection path with a reaction unit;

selecting ions along a second ion selection path connected to the reaction path; and detecting the ions, wherein the reaction unit comprises a reaction pipe extending to define the reaction path, wherein a sample inflow pipe coupled to the reaction pipe, wherein the sample inflow pipe provides a sample inflow path connected to the reaction path, and the sample inflow path comprises an inclined path, and wherein the inclined path extends to form an acute angle ($\alpha$) with respect to the first ion selection path and the reaction path.

* * * * *